United States Patent [19]

Caron et al.

[11] Patent Number: 5,299,452
[45] Date of Patent: Apr. 5, 1994

[54] METHOD AND APPARATUS FOR ESTIMATING VEHICLE BRAKING SYSTEM EFFECTIVENESS

[75] Inventors: LaVerne A. Caron, Kalamazoo; Richard J. Youngblood, Battle Creek, both of Mich.

[73] Assignee: Eaton Corporation, Cleveland, Ohio

[21] Appl. No.: 986,797

[22] Filed: Dec. 8, 1992

[51] Int. Cl.$^5$ .............................................. G01L 5/28
[52] U.S. Cl. .................................. 73/129; 364/426.01
[58] Field of Search ...................... 73/129; 364/426.01, 364/426.02

[56] References Cited

U.S. PATENT DOCUMENTS 4,520,663  6/1985  Moore et al. ......................... 73/129

Primary Examiner—Jerry W. Myracle
Attorney, Agent, or Firm—Brooks & Kushman

[57] ABSTRACT

Vehicle engine torque, acceleration, deceleration and brake treadle pressure are determined. Vehicle load is calculated from the engine torque and acceleration; and braking system effectiveness is calculated by comparing the determined deceleration with a deceleration predicted for the calculated vehicle load and the determined brake treadle pressure. Values representative of braking system effectiveness are accumulated and evaluated to more accurately determine when braking system service is required than is possible by merely scheduling service according to the amount of elapsed time or the number of miles driven since prior service was performed.

16 Claims, 2 Drawing Sheets

METHOD AND APPARATUS FOR ESTIMATING VEHICLE BRAKING SYSTEM EFFECTIVENESS

TECHNICAL FIELD

This invention relates to apparatuses and methods for estimating the effectiveness of vehicle braking systems.

BACKGROUND ART

This patent application incorporates by reference subject matter contained in the U.S. patent application titled "Method and Apparatus for Determining a Need for Vehicle Braking System Maintenance," the latter application having U.S. Ser. No. 07/987,134, having common inventors and assignee, and being filed simultaneously herewith. The subject matter of the referenced patent application is incorporated for reference and is not essential to support the claims or to adequately disclose the invention of the present application.

Various systems for estimating the effectiveness of vehicle braking systems have been used. A common, "bookkeeping" method is to maintain records of the time elapsed and the number of miles travelled by a vehicle since its braking system has last been serviced so that such service can be performed before braking effectiveness declines to a critical level or to a level that incurs additional problems and/or expenses.

The bookkeeping method offers advantages of being uncomplicated and inexpensive. The conditions under which a vehicle may be driven during periods of similar duration, however, often vary between extremes, for example, heavy versus light traffic, hilly versus flat terrain, high versus low temperature and wet versus dry weather; and such extremes have a substantial affect on the rate and type of brake debilitation experienced. Consequently, the bookkeeping method cannot be expected to be consistently accurate, and disadvantages attending it include, at best, extra physical examinations and prematurely scheduled service and, at worst, service that is scheduled too late.

Brake lining wear does not always proceed at a linear rate, but it does require some time for wear to occur. Certain other parts of the braking system can, however, go from a fully functional condition to a nonfunctional condition very rapidly due to breakage or leakage resulting from the fatigue or injury of critical parts. If a nonfunctional part causes only a portion of the braking system to be nonfunctional or partly so, a driver might not notice the resulting decrease in braking efficiency for some time. During this period, additional damage is invited; and the linings of brakes remaining functional are likely to wear more rapidly than when all brakes are working with the same effectiveness.

While bookkeeping methods of determining the effectiveness of braking systems function with a certain degree of efficiency, they do not provide the advantages of the improved method and apparatus of the present invention as is hereinafter more fully described.

DISCLOSURE OF THE INVENTION

An object of the present invention is to provide an improved apparatus and method for accurately estimating the overall effectiveness of a braking system so that service is not performed needlessly but is performed as required.

In realizing the aforementioned and other objects, the apparatus includes means such as an engine control unit having a capability of determining engine torque during a period when the vehicle is being accelerated and generating a torque signal representative of the torque. Means such as an automatic braking system (ABS) control unit are also included for determining, during this period, vehicle acceleration and generating an acceleration signal representative of the acceleration.

Means such as a pressure transducer, or sensor, measures brake treadle pressure when the vehicle is being decelerated during an application of its brakes. The pressure transducer is connected to the automatic braking system control unit, which generates a brake pressure signal representative of the treadle pressure. When the vehicle is being decelerated, the automatic braking system control unit determines the vehicle deceleration and generates a deceleration signal representative of the deceleration. The automatic braking system control unit includes a computer having a processor and a memory.

The method for accurately estimating the effectiveness of a braking system includes accelerating the vehicle and obtaining a measure of the engine torque from the engine control unit and a measure of the vehicle acceleration from the automatic braking system control unit. From the engine torque and the vehicle acceleration, the vehicle load is calculated.

When the vehicle is decelerated by applying its brakes, measures of the brake treadle pressure and vehicle deceleration are obtained. From the vehicle load, the brake treadle pressure, and the vehicle deceleration, an estimate of the effectiveness of the braking system is calculated by comparing the determined deceleration with a deceleration predicted for the calculated vehicle load and the determined brake treadle pressure.

The object and others of the present invention are readily apparent from the following detailed description of the best mode for carrying out the invention when taken in connection with accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
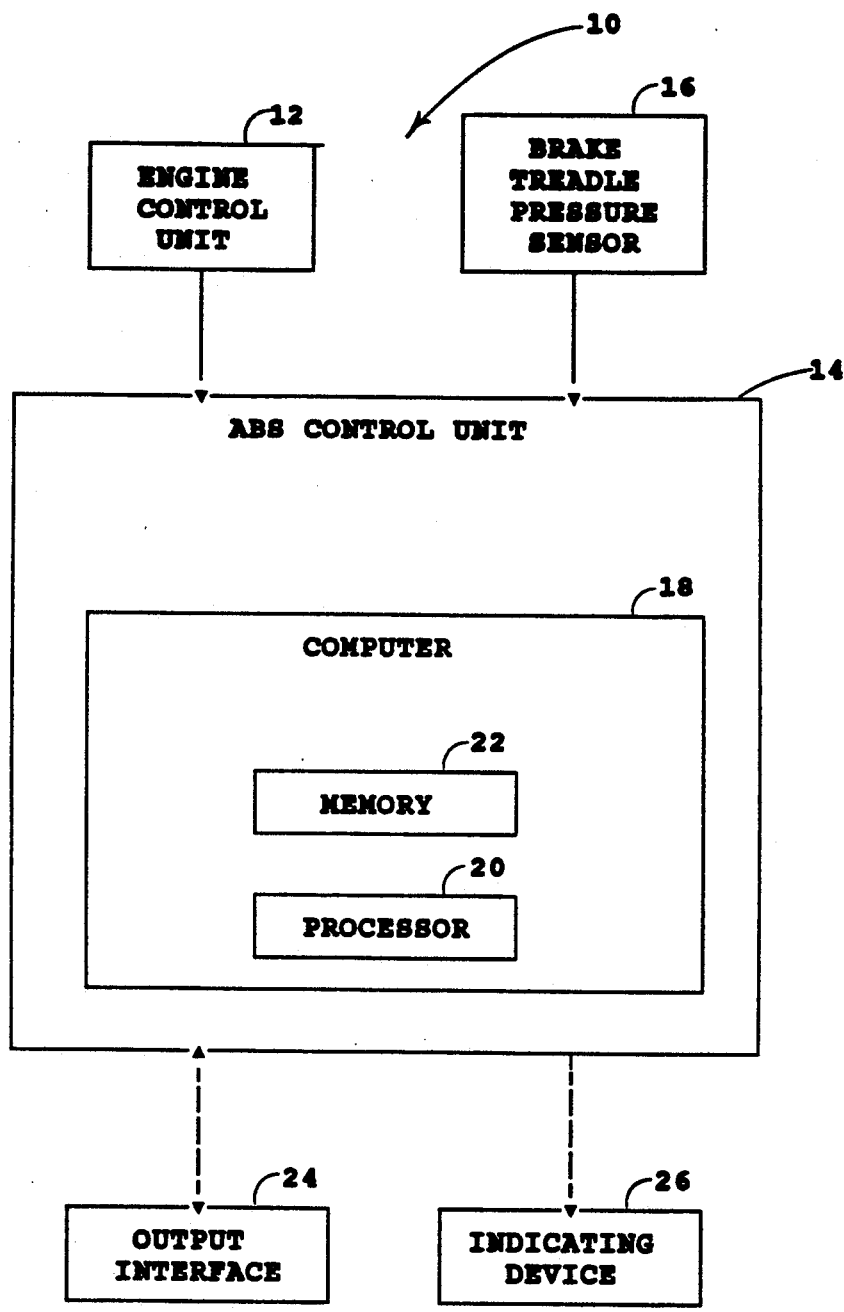
FIG. 1 is a block diagram of the major elements of the present invention.

As shown in FIG. 1, a first embodiment of the apparatus, generally indicated by reference numeral 10, for estimating the effectiveness of a braking system includes means for determining engine torque, means for determining vehicle acceleration and means for determining brake treadle pressure. Preferably, the means for determining engine torque includes an engine control unit 12, the means for determining vehicle acceleration includes an automatic braking system (ABS) control unit 14, and the means for determining brake treadle pressure includes a brake treadle pressure transducer, or sensor, 16. The engine control unit 12 and the brake treadle pressure sensor 16 each has an output that is connected to the automatic braking system control unit 14. The automatic braking system control unit 14 includes a computer 18 having a processor 20 and a memory 22.

It should be noted that the foregoing elements commonly have functions in addition to those associated with the present invention, each of such functions possibly requiring specific interconnections different from or in addition to those shown in FIG. 1.

A second embodiment of the apparatus includes an output interface 24 that is connected to the automatic braking system control unit 14, and a third embodiment includes an indicating device 26 that is also connected to the automatic braking system control unit 14. The connections between the output interface 24, the indicating device 26 and the automatic braking system control unit 14 are shown by dashed lines in FIG. 1.

Figure 2:
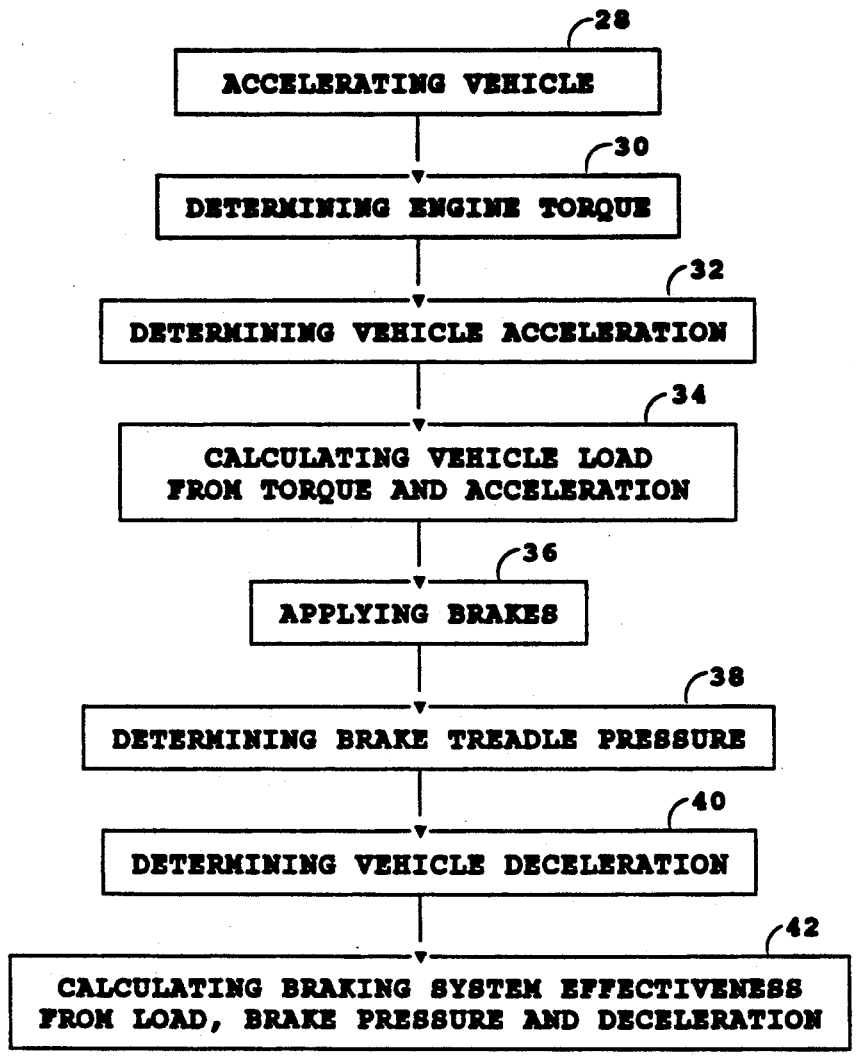
FIG. 2 is a flow diagram illustrating the method of the present invention.

The method for using the apparatus 10 for estimating the effectiveness of the braking system is outlined in FIG. 2 and can be understood with reference to both FIGS. 1 and 2. In operation, a vehicle (not shown) equipped with an engine, a brake treadle and the apparatus 10 for estimating the effectiveness of a braking system is accelerated 28. Engine (brake) torque is determined 30 by the engine control unit 12 from the rate of engine fuel use per stroke in view of known engine friction characteristics and engine speed. A torque signal is generated by the engine control unit 12 that is representative of the engine torque.

Vehicle acceleration is determined 32 by the automatic braking system control unit 14 by calculating the derivative of wheel speed, which, when the wheels are not slipping, is the same as vehicle speed. Under most conditions, steer wheels are not capable of locking and reflect substantially accurate vehicle speed. Vehicle speed is assumed to be the highest of the initial speed decelerated at 0.5 g (the approximate maximum deceleration rate for a heavy truck) or the highest wheel speed provided it is no more than twenty percent higher than any other wheel speed. An acceleration signal is generated by the automatic braking system control unit 14 that is representative of the vehicle acceleration. Using an arithmetic function, the computer 18 processes the data resident in the torque and acceleration signals in its processor 20, calculates 34 the total load of the vehicle, and stores the result in its memory 22.

When force is applied 36 to the brake treadle, brakes are applied to decelerate the vehicle. The brake treadle pressure sensor 16 senses 38 the amount of pressure applied to the brake treadle and communicates this data to the automatic braking system control unit 14, which generates a brake pressure signal that is representative of the brake treadle pressure. The deceleration of the vehicle is determined 40 by the automatic braking system control unit 14 by calculating the derivative of wheel speed, and a deceleration signal is generated thereby that is representative of the vehicle deceleration.

Using an arithmetic function, the computer 18 processes vehicle load data and the data resident in the brake pressure and deceleration signals in its processor 20. The computer 18 then calculates 42 the effectiveness of the vehicle braking system by comparing the determined deceleration with a deceleration predicted for the calculated vehicle load and the determined brake treadle pressure. The computer 18 generates an effective brake signal if the determined deceleration is within a predetermined range of the predicted deceleration and generates an ineffective brake signal if the determined deceleration is not within the range. The determined and calculated data are stored in the memory 22.

The ensuing provides a more detailed explanation of the determination of braking efficiency. When a vehicle slows or stops, a certain amount of energy must be dissipated. This amount is represented by the following equation:

$$E_k = \frac{1}{2} m V_0^2 - \frac{1}{2} m V_1^2$$

where:
$E_k$ is the energy dissipated,
$V_0$ is the initial speed,
$V_1$ is the final speed, and
m is the mass of the vehicle.

The measure of effectiveness (e in the following equation) is determined by the amount of time required to decelerate between the two energy levels for a given brake pressure.

$$e = K \frac{\frac{1}{2} m V_0^2 - \frac{1}{2} m V_1^2}{\text{Time} * \text{Brake Pressure}}$$

In real time, this is handled as an integration algorithm. For a fixed time, for example, a 10 millisecond loop time, the decrease in vehicle energy divided by the treadle pressure can be calculated and averaged with previously accumulated values. The averaging process is used to determine a long-term trend. This mitigates effects resulting from braking on hills, head winds, tail winds and the like. A typical averaging scheme, actually an exponential filter, is represented by the following equation.

$$\text{Accumulated Value} = \frac{\text{New Value}}{1000} + \left( \text{Old Value} * \frac{99}{1000} \right)$$

The highest accumulated value is retained for reference, the ratio of the current accumulated value to the highest recorded value indicating the level of brake deterioration. Upon initial configuration of a vehicle, the effectiveness is defaulted to 100 percent. As the brakes burnish, the effectiveness and the maximum value will both increase; and the ratio will remain at 100 percent for a substantial period. Eventually, brake wear and maladjustment will contribute to a decrease in brake effectiveness.

As previously mentioned, in a second embodiment of the apparatus 10 for determining the effectiveness of the braking system, the automatic braking system control unit 14 is also connected, as indicated by a dashed line in FIG. 1, to the output interface 24. The output interface 24 provides external access to data stored in the memory 22 of the computer 18 so that periodic vehicle maintenance can include an evaluation of vehicle braking system effectiveness to determine the need for servicing the braking system.

Engine torque, vehicle acceleration, vehicle load, brake treadle pressure, and vehicle deceleration data can also be stored and, with braking system effectiveness data, can be copied or unloaded for storage elsewhere or used for performance reports, maintenance scheduling, maintenance cost predicting and the like. If authorities would accept the data, it could also be readily provided for use in roadside inspections. The output interface 24 can be any of a number of well-known devices, one of the simplest being a receptacle to which data signals from the computer 18 are communicated and to which an external plug can be mated to communicate the data signals to an external computer or data storage device.

As also previously mentioned, in a third embodiment of the apparatus 10 for determining the effectiveness of the braking system, the automatic braking system control unit 14 is connected, as indicated by a dashed line in FIG. 1, to an indicating device 26. This provides an indication to service personnel when the effectiveness of the braking system has been reduced below a predetermined level. The indicating device 26 can be any of a number of well-known visual or auditory devices.

While the best mode for carrying out the invention has been described in detail, those familiar with the art to which this invention relates will recognize various alternative designs and embodiments for practicing the invention as defined by the following claims.

What is claimed is:

1. Apparatus for estimating the effectiveness of a braking system in a wheeled vehicle including an engine, a brake treadle, and fluid-actuated brakes having normally operable and automatically operable braking modes, the apparatus comprising:
 means for determining engine torque and generating a torque signal representative thereof;
 means for determining vehicle acceleration and deceleration and generating respective acceleration and deceleration signals representative thereof;
 means for determining brake treadle pressure during vehicle deceleration in the normally operable braking mode and generating a brake pressure signal representative thereof; and
 calculating means for calculating, from data represented by the torque signal and the acceleration signal, vehicle load and for calculating, from data represented by the brake pressure signal and the deceleration signal, braking system effectiveness by comparing the determined deceleration with a deceleration predicted for the calculated vehicle load and the determined brake treadle pressure, the calculating means generating an effective brake signal if the determined deceleration is within a predetermined range of the predicted deceleration and generating an ineffective brake signal if the determined deceleration is not within the range.

2. The apparatus as defined by claim 1, wherein the calculating means comprises an automatic braking system control unit that includes a computer having a processor for calculating the vehicle load and the braking system effectiveness and having a memory for accumulating measures of engine torque, vehicle acceleration, brake treadle pressure and vehicle deceleration and calculation results including vehicle load and braking system effectiveness.

3. The apparatus as defined by claim 2, wherein the apparatus further comprises an output interface connected to the automatic braking system control unit for providing external access to data accumulated in the memory and to the measures of engine torque, vehicle acceleration, brake treadle pressure and vehicle deceleration and calculation results of vehicle load and braking system effectiveness.

4. The apparatus as defined by claim 2, further comprising an indicating device connected to the automatic braking system control unit and responsive to the ineffective brake signal for providing an immediate indication when the effectiveness of the braking system is below a predetermined level.

5. The apparatus as defined by claim 2, wherein the means for determining engine torque comprises an engine control unit that derives a measure of engine torque from the rate of engine fuel use per stroke in view of known engine friction characteristics and engine speed.

6. The apparatus as defined by claim 5, wherein the means for determining vehicle acceleration and deceleration comprises an automatic braking system control unit that controls vehicle deceleration when the brakes are being operated in the automatically operable braking mode and that derives a measure of vehicle acceleration and deceleration by calculating the derivative of wheel speed when the brakes are being operated in the normally operable braking mode.

7. The apparatus as defined by claim 6, wherein the means for determining brake treadle pressure includes the automatic braking system control unit and further comprises a brake treadle pressure transducer that senses the amount of pressure applied to the brake treadle and communicates this data to the automatic braking system control unit.

8. A method for estimating the effectiveness of a braking system in a vehicle having an engine and a brake treadle, the method comprising the steps of:
 accelerating the vehicle;
 determining engine torque during vehicle acceleration;
 determining the vehicle acceleration;
 calculating vehicle load from the engine torque and the vehicle acceleration;
 applying pressure to the brake treadle to decelerate the vehicle;
 determining brake treadle pressure;
 determining vehicle deceleration; and
 calculating braking system effectiveness by comparing the determined deceleration with a deceleration predicted for the calculated vehicle load and the determined brake treadle pressure.

9. The method as defined by claim 8, further including the steps of:
 determining a deceleration range within which determined deceleration is defined as being acceptable;
 generating an effective brake signal if the determined deceleration is within the range; and
 generating an ineffective brake signal if the determined deceleration is not within the range.

10. The method as defined by claim 9, further including the steps of:
 accumulating calculation results of braking system effectiveness; and
 comparing subsequent calculation results of braking system effectiveness with the accumulated calculation results to track deteriorating braking system effectiveness.

11. The method as defined by claim 9, wherein the vehicle further comprises an indicating device, the method further including the step of actuating the indicating device in response to the generation of an ineffective brake signal.

12. A system for estimating the effectiveness of a braking system in a vehicle having an engine and a brake treadle and having an engine control unit and an automatic braking system control unit, the system comprising:

means for determining engine torque during vehicle acceleration;

means for determining vehicle acceleration;

means for determining brake treadle pressure;

means for determining vehicle deceleration; and means for calculating vehicle load from the engine torque and the vehicle acceleration and for calculating the effectiveness of the braking system by comparing the determined deceleration with a deceleration predicted for the calculated vehicle load and the determined brake treadle pressure.

13. The system as defined by claim 12, further including:

means for generating an effective brake signal if the determined deceleration is within a predetermined range; and means for generating an ineffective brake signal if the determined deceleration is not within the predetermined range.

14. The system as defined by claim 13, further including:

means for accumulating calculation results of braking system effectiveness; and means for comparing subsequent calculation results of braking system effectiveness with the accumulated calculation results to track deteriorating braking system effectiveness.

15. The system as defined by claim 14, further including means for electrically interfacing the means for accumulating calculation results of braking system effectiveness with an external device.

16. The system as defined by claim 14, further including means for indicating when the calculated braking system effectiveness is below a predetermined level.

* * * * *